(12) United States Patent
Mori (10) Patent No.: US 8,583,080 B2
(45) Date of Patent: Nov. 12, 2013

(54) ACCESS CONTROL METHOD FOR CERTAIN USER TARGETED BASE STATION, BASE STATION APPARATUS AND MOBILE COMMUNICATION MANAGEMENT APPARATUS

(75) Inventor: Shinichi Mori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 432 days.

(21) Appl. No.: 12/597,805

(22) PCT Filed: Apr. 25, 2008

(86) PCT No.: PCT/JP2008/058095
§ 371 (c)(1),
(2), (4) Date: Oct. 27, 2009

(87) PCT Pub. No.: WO2008/136422
PCT Pub. Date: Nov. 13, 2008

(65) Prior Publication Data
US 2010/0120461 A1    May 13, 2010

(30) Foreign Application Priority Data

Apr. 27, 2007   (JP) ................................. 2007-120261

(51) Int. Cl.
*F16B 35/04*    (2006.01)
(52) U.S. Cl.
USPC ........................................ 455/411; 455/414.2
(58) Field of Classification Search
USPC .................... 455/554.1, 555, 432.1, 436, 411
See application file for complete search history.

(56) References Cited

U.S. PATENT DOCUMENTS

| 2002/0022483 | A1* | 2/2002 | Thompson et al. | ............ 455/439 |
| 2004/0185879 | A1* | 9/2004 | Kong et al. | .................... 455/458 |
| 2006/0229075 | A1* | 10/2006 | Kim et al. | ....................... 455/436 |
| 2007/0054668 | A1* | 3/2007 | Scheinert et al. | .......... 455/435.1 |

OTHER PUBLICATIONS

International Search Report for PCT/JP2008/058095 mailed Jun. 3, 2008 (7 pages).
Written Opinion of ISA for PCT/JP2008/058095 mailed Jun. 3, 2008 (corrected Jun. 26, 2008) (3 pages).
3GPP TSG RAN WG2 Meeting #57bis R2-071428, "Use of home & private eNBs," Samsung, Mar. 30, 2006, particularly, p. 2, lines 6 to 7, "the MME can assign an additional TA to the UE i.e. The TA corresponding with home/private eNB" (3 pages).

(Continued)

*Primary Examiner* — Tu X Nguyen
(74) *Attorney, Agent, or Firm* — Osha Liang LLP (57) ABSTRACT

In a mobile communication system including Home eNBs, information on mobile stations permitted to access each Home eNB can be easily registered, and the permitted mobile stations can be connected to the Home eNB substantially at the same time of the registration of the access permission. In order to control access to a certain user targeted base station, the information on mobile stations permitted to access the certain user targeted base station is supplied to the certain user targeted base station. Then, the information on the access permitted mobile stations is transmitted to a mobile communication management apparatus on a network. The access permitted mobile station registration is stored in the mobile communication management apparatus in association with the certain user targeted base station. When the access permitted mobile station has entered a location registration area covering the certain user targeted base station or exists in the location registration area, the mobile communication management apparatus transmits connection information for the certain user targeted base station to the mobile station.

15 Claims, 7 Drawing Sheets

(56) References Cited

OTHER PUBLICATIONS

3GPP TSG RAN WG2 Meeting #58 R2-072071, "Discussion of Mobility Requirements for Home-eNodeB," Vodafone Group, May 11, 2007, particularly, p. 3, iv, "the MME provides an indication to the UE that Home-eNodeB is in the Registration Area of the UE" (3 pages).
3GPP TSG RAN #35 RP-070209 Lemesos, Cyprus, Mar. 6-9, 2007 "Requirements for LTE Home eNodeBs" Orange et al. (4 pages).

* cited by examiner

ACCESS CONTROL METHOD FOR CERTAIN USER TARGETED BASE STATION, BASE STATION APPARATUS AND MOBILE COMMUNICATION MANAGEMENT APPARATUS

TECHNICAL FIELD

The present invention generally relates to the field of mobile communication and more particularly relates to an access control method including registration and/or deletion of users individually permitted to access a certain user targeted base station in a mobile communication network having introduced small and low-cost private base stations for certain or specified users (Home e-NodeB) as well as a base station apparatus and a mobile communication management apparatus.

BACKGROUND ART

Presently, it is being discussed and proposed to introduce a very small base station targeted for certain or specified users for implementing FMC (Fixed and Mobile Convergence) services (see "Requirements for LTE Home eNodeBs", RP-070209, 3GPP TSG RAN #35, Lemesos, Cyprus, 6-9 Mar. 2007). In LTE (Long Term Evolution), whose specification development is being currently ongoing, as a successor to the third generation radio access scheme, such very small base stations targeted for certain or specified users are collectively referred to as Home eNBs (or Home e-NodeBs). The Home eNB is a so-called plug-and-play type of apparatus that a user can buy and install at a desired location without the necessity, of operator's manual installation, maintenance and management.

Since the Home eNB serves as a private base station for certain or specified users, the Home eNB differs from general-purpose base stations constituting an existing public communication network, and it is not reasonable that all subscribers be permitted to access the Home eNB. Conventionally, in order to gain permission to access the general-purpose base stations constituting a mobile communication network, a user has only to subscribe to any communication operator and have user information registered with storage devices provided by the communication operator such as a HLR (Home Location Register) and a HSS (Home Subscriber Server). When the user subscribes to the communication operator, the user information is registered by the communication operator with the HLR. Before initiation of communications with a mobile station (user), the general-purpose base station targeted for the public determines whether the user is an authorized one through authentication of the mobile station based on the user information in the HLR.

However, it has not been conceived that access permission be registered for each base station. Acquiring access authority by subscribing to a communication operator conventionally means that it is permitted to access all base stations or a set of base stations (except base stations during maintenance) operated by the communication operator.

DISCLOSURE OF INVENTION

Problem to be Solved by the Invention

For a private base station targeted for certain or specified users such as a Home eNB, it is desired that selection, registration, addition and deletion of a mobile station (user) authorized to access the Home eNB be authorized by an owner of the Home eNB. However, no apparatus or signaling is provided in nodes constituting a current public communication network.

Also, in order to introduce a Home eNB more easily, it is necessary that the owner of the Home eNB can grant individual mobile stations the access authority easily or automatically at any time without declaration to the communication operator in advance. Also, it is desired that the Home eNB can initiate service to the mobile stations, for which access permission has been registered by the owner of the Home eNB, at the same time as that of granting the access permission. Further, the Home eNB must use information registered by the owner of the Home eNB to authenticate the mobile stations before initiation of communications with the mobile stations.

Thus, one object of the present invention is to provide a method and an apparatus that make it possible for an owner of a Home eNB to register information of mobile stations permitted to access the Home eNB easily in a mobile communication system including Home eNBs.

Also, another object of the present invention is to provide a method and an apparatus for enabling the Home eNB to connect to the permitted mobile stations at substantially the same time as that of registration of the access permission.

Means for Solving the Problem

In order to achieve the above objects, according to a first aspect of the present invention, an access control method for a certain user targeted base station is provided. The method includes supplying information regarding a mobile station permitted to access the certain user targeted base station to the certain user targeted base station; transmitting the information regarding the access permitted mobile station to a mobile communication management apparatus on a network; storing the information regarding the access permitted mobile station in the mobile communication management apparatus in association with the certain user targeted base station; and upon detection that the access permitted mobile station has entered a location registration area covering the certain user targeted base station or exists in the location registration area, transmitting connection information for the certain user targeted base station from the mobile communication management apparatus to the mobile station.

In a preferred embodiment, when any mobile station issues a connection request to the certain user targeted base station, user authentication may be performed at either the mobile communication management apparatus or the certain user targeted base station.

According to a second aspect of the present invention, a certain user targeted base station apparatus is provided. The certain user targeted base station apparatus includes an input unit configured to supply information regarding a mobile station permitted to access the certain user targeted base station; a user information update unit configured to, in response to the supplying, generate a registration request for the access permitted mobile station; and a transmitting unit configured to transmit the registration request to a mobile communication management apparatus on a network.

In a preferred embodiment, the certain user targeted base station apparatus further includes an authentication request unit configured to, upon reception of a connection request from a mobile station, generate a user authentication request for the mobile communication management apparatus; and a connection permission unit configured to, upon reception of an authentication result indicative of a connection permission from the mobile communication management apparatus, permit the mobile station to connect to the certain user targeted base station.

In another embodiment, the certain user targeted base station apparatus may further include a storage unit configured to, upon reception of a registration completion message for the access permitted mobile station from the mobile communication management apparatus, store information regarding the access permitted mobile station; and a user authentication unit configured to, upon reception of a connection request from a mobile station, authenticate the mobile station with reference to the storage unit.

According to a third aspect of the present invention, a mobile communication management apparatus is provided. The mobile communication management apparatus includes a receiving unit configured to receive access control information regarding a mobile station permitted to access a certain user targeted base station from the base station; a storage unit configured to store the access control information; a mobile station location monitoring unit configured to monitor location of a mobile station at a level of location registration areas; a connection information transmitting unit configured to, when the mobile station location monitoring unit detects that the access permitted mobile station has entered a location registration area or exists in the location registration area, transmit connection information for the certain user targeted base station to the access permitted mobile station.

Advantage of the Invention

According to the above-mentioned method and apparatuses, in a mobile communication system including Home eNBs, for each Home eNB, mobile stations permitted to access the Home eNB can be easily registered. Also, it is possible to connect the mobile stations to the Home eNBs immediately.

LIST OF REFERENCE SYMBOLS

10: mobile station
20: Home eNB (certain user targeted base station)
21T: transmit antenna
21R: receive antenna
22: mobile station targeted receiving unit
23: user authentication request unit
24: network interface
25: user interface
26: user information update unit
27: user connection permission unit
28: mobile station targeted transmitting unit
30: macro eNB
40: upper node
40A: MME (mobile communication management apparatus)
40B: UPE (or S-GW (Serving Gateway))
41: network interface
42: base station targeted receiving unit
43: user setting unit
44: access controlled mobile station database
45: mobile station location monitoring unit
46: Home eNB frequency database
47: indication information generation unit
48: user authentication unit
49: user authentication response unit
51: base station targeted transmitting unit
61: user information database
62: user authentication unit

BEST MODE FOR CARRYING OUT THE INVENTION

Figure 1:
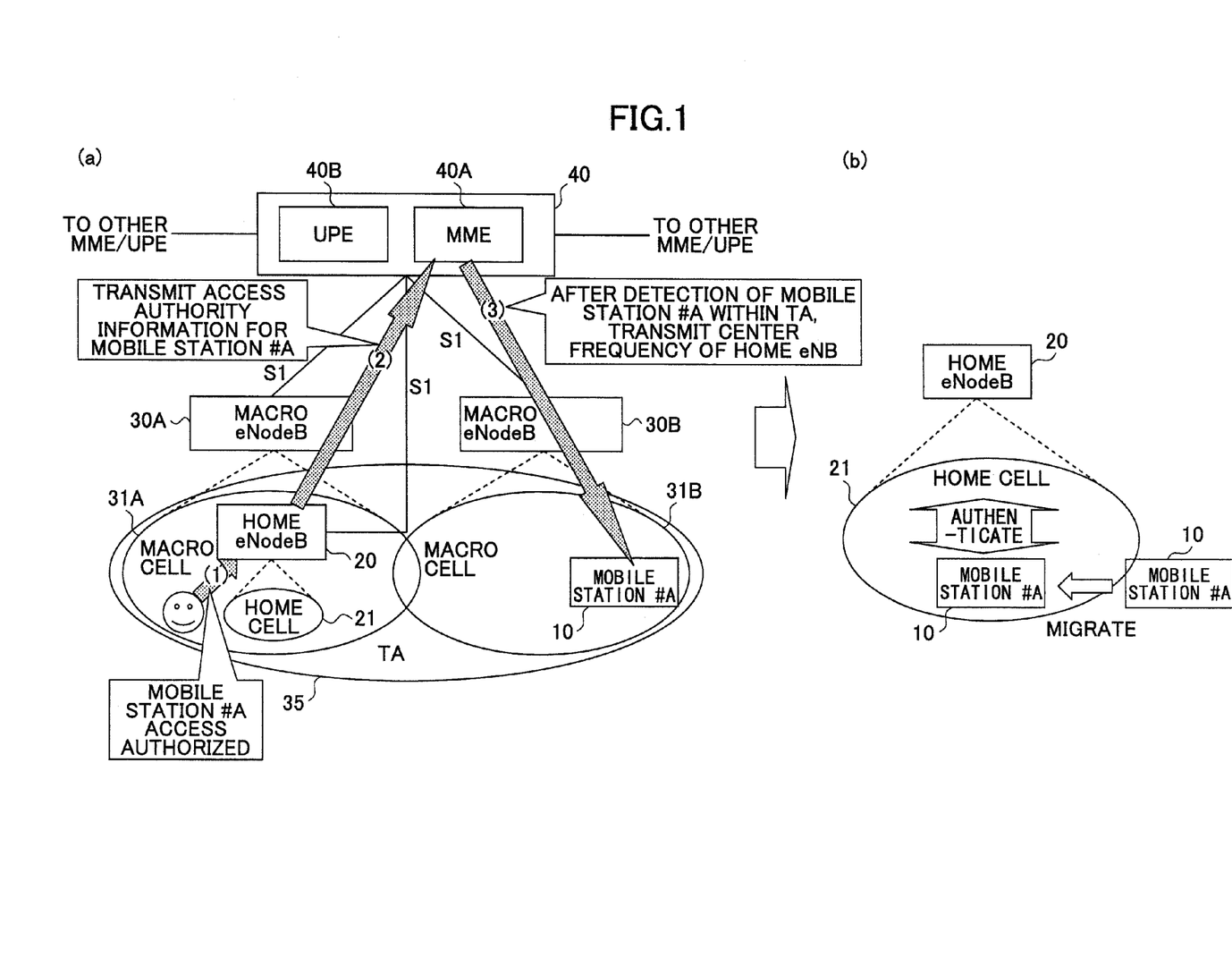
FIG. 1 schematically illustrates an exemplary mobile communication system to which the present invention is applied.

Preferred embodiments of the present invention are described below with reference to the accompanying drawings. FIG. 1 schematically illustrates an exemplary arrangement and fundamental operations of a mobile communication system according to embodiments of the present invention. In the mobile communication system illustrated in FIG. 1(a), multiple radio base stations 30A, 30B, . . . constituting a public communication network form macro cells 31A, 31B, . . . , respectively, in such a manner that the macro cells 31A, 31B, . . . have overlapped boundaries. The radio base stations 30 forming the macro cells 31 are referred to as macro eNBs. The macro eNBs 30A and 30B are logically connected with an upper management node 40 over a logical interface S1. For example, the upper management node 40 may include a MME (Mobile Management Entity) 40A and a UPE (User Plane Entity) 40B. The UPE 40B may be also referred to as a S-GW (Serving Gateway).

A Home eNB 20, a private base station owned by a certain user, is provided within the macro cell 31A. The Home eNB 20 is also logically connected with the upper management node (MME/UPE) 40 over the logical interface S1. In the illustration in FIG. 1(a), a tracking area (TA) 35 is formed to cover the macro cells 31A and 31B in terms of location registration. The tracking area 35 is associated with the Home eNB 20.

The Home eNB 20 can only be connected to one or more mobile stations permitted by the owner to access the Home eNB 20. To this end, access permission information on just the access permitted mobile stations is supplied to the Home eNB 20 (arrow (1)). The supplied information is transmitted to the MME 40A serving as an upper mobile communication management apparatus (arrow (2)). The MME 40A manages locations of mobile stations at the level of tracking areas. Thus, once the access permission information for a mobile station 10 is registered, upon detection of existence of the mobile station 10 within the tracking area 35 associated with the Home eNB 20 or detection of the mobile station 10 entering the tracking area 35, the MME 40A transmits a center frequency presently used by the Home eNB 20 and/or other cell parameters to the mobile station 10 immediately. As a result, the Home eNB 20 can provide the permitted mobile station 10 with connection services to the Home eNB 20 at the same time of or near the time of access permission.

As illustrated in FIG. 1(b), it is assumed that the mobile station 10 has approached the Home eNB 20 and entered a home cell 21. When the mobile station 10 resides in an adjacent macro cell 31B within the tracking area 35, the center frequency for the Home eNB 20 has been transmitted to the mobile station 10. Thus, the mobile station 10 could detect the center frequency used by the Home eNB 20 through cell search and connect to the Home eNB 20. The Home eNB 20 uses registered information to authenticate the mobile station 10. In other words, for mobile stations that do not reside within the tracking area 35 associated with the target Home eNB 20, even if the mobile stations are permitted to access the Home eNB 20, the cell search parameters would not be transmitted to the mobile stations, which can reduce signaling workload.

The permission to access the Home eNB 20 is not limited to mobile stations accessing the Home eNB 20 constantly and may be also applied to mobile stations temporarily or sporadically accessing the Home eNB 20. As stated below, access permission deletion information has to be supplied only to a mobile station whose access permission should be canceled. Also, the access permission information for the access permitted mobile station may not be registered until that mobile station has entered the home cell 21 of the Home eNB 20. Also in this case, the MME 40A follows the location of the mobile station 10 at the level of tracking areas, for example. Thus, immediately after reception of the access permission information from the Home eNB 20, the MME 40A can transmit the center frequency and/or others for the Home eNB 20 via the resident macro eNB 30A.

As specific access control methods on a per-Home eNB basis, it can be conceived that (1) the access control information is centered on the upper node MME 40A without distribution of the access control information over Home eNBs or that (2) the access control information is stored in individual Home eNBs. Exemplary operation sequences and arrangements of respective apparatuses for implementing the above two methods are described in detail below.

[First Embodiment]

Figure 2:
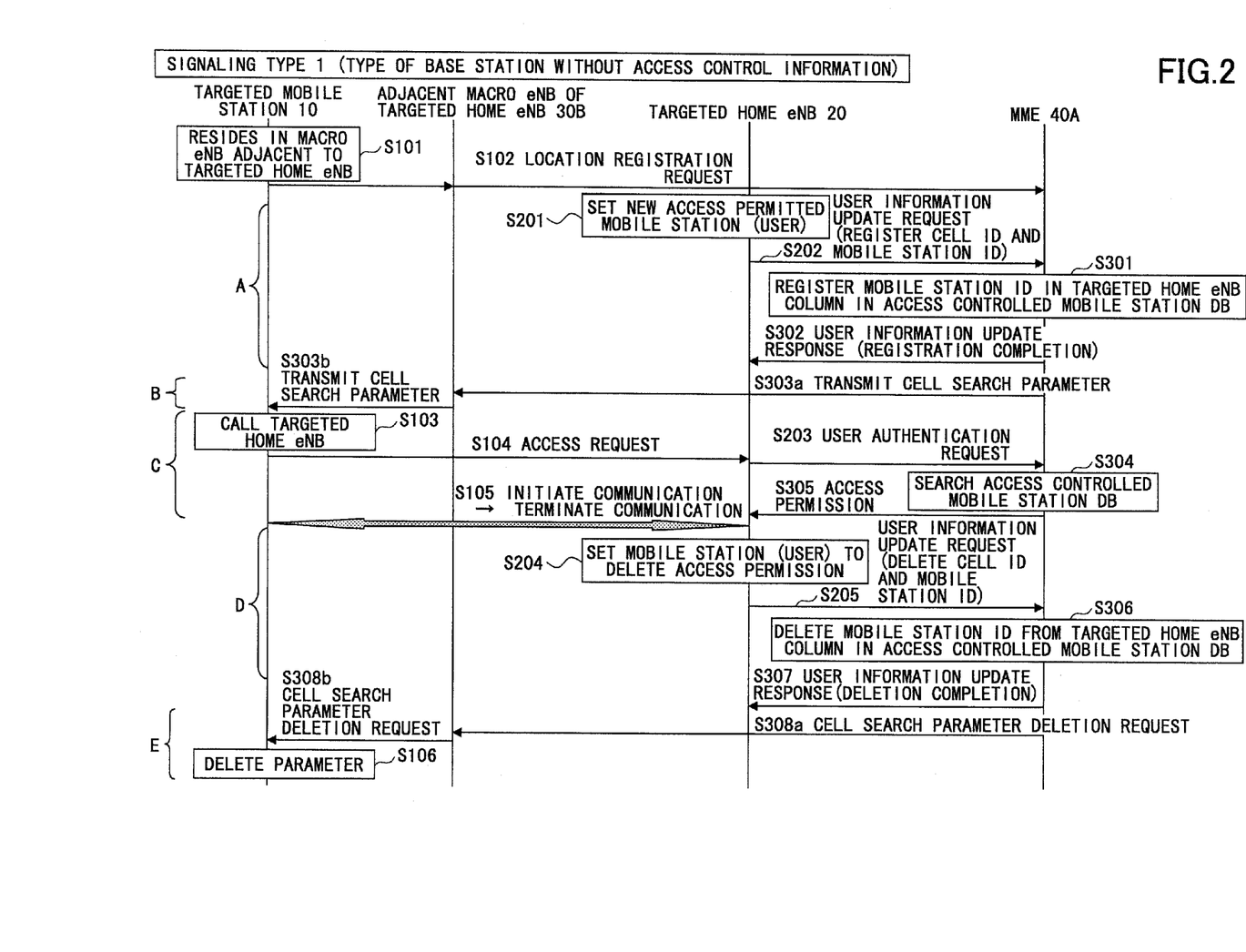
FIG. 2 is a sequence diagram illustrating exemplary registration and/or deletion of access permitted mobile station information according to a first embodiment.

In the first embodiment, the access control information is centered on the MME 40A without distribution over the Home eNBs 20. FIG. 2 is a sequence diagram illustrating exemplary signal flow among the mobile station 10, the adjacent macro cell 35B, the Home eNB 20 and the MME 40A.

At step S101, the mobile station 10 resides in the adjacent macro cell 31B within a current tracking area 35 and is approaching the Home eNB 20. Based on information broadcast from the macro eNB 30B over a common control channel such as a BCH, the mobile station 10 recognizes that the mobile station 10 has entered the tracking area 35 and transmits a location information update request to the MME 40A via the macro eNB 30B.

At step S201, the Home eNB 20 sets access permission information (user information) to grant new access permission to the mobile station 10. At step S202, the Home eNB 20 transmits a user information update request to the MME 40A. The user information may include a new registration request, a cell ID for the Home eNB 20, a mobile station ID and an access control type.

As stated below, the MME 40A includes an access controlled mobile station database for recording information on mobile stations to be access controlled for each Home eNB. At step S301, the MME 40A registers the user information for the mobile station 10 in a column or field for the Home eNB 20 in the database. The user information includes the mobile station ID and the access type for the mobile station 10. After the registration, at step S302, the MME 40A transmits a user information update response indicative of registration completion of the mobile station 10 to the Home eNB 20. The above-mentioned steps correspond to registration sequence A for the access permitted mobile station.

Since the MME 40A comprehends that the newly registered mobile station 10 resides in the macro eNB 30 within the tracking area 35 associated with the Home eNB 20, at step S303a, the MME 40A transmits cell search parameters including the center frequency for the Home eNB 20 to the macro eNB 30B. At step S303b, the cell search parameters are transmitted from the macro eNB 30B to the mobile station 10 in a dedicated control channel. The above-mentioned steps correspond to parameter transmission sequence B when the access permitted mobile station resides in the adjacent macro eNB.

Since the center frequency for the Home eNB 20 is transmitted from the MME 40A to the mobile station 10, the mobile station 10 transmits calls to the Home eNB 20 at the center frequency at step S103 and issues an access request at step S104. At step S203, the Home eNB 20 requests the MME 40A to authenticate the mobile station 10. At step S304, the MME 40A searches the access controlled mobile station database for the mobile station 10. If the MME 40A determines that the mobile station 10 is permitted to access the Home eNB 20, at step S305, the MME 40A returns an access permission to the Home eNB 20. The above-mentioned steps correspond to authentication sequence C for the access permitted mobile station.

At step S105, the mobile station 10 communicates with the Home eNB 20. For example, if the user of the mobile station 10 is an outside participant or a guest speaker in a lecture or a meeting held in a building or an office where the Home eNB 20 is installed, it is less necessary to permit the mobile station 10 to access the Home eNB 20 constantly. To this end, when the access permission becomes unnecessary, the Home eNB 20 sets access permission deletion information for the mobile station 10 at step S204 and transmits a user information update request to the MME 40A at step 5205. This user information update request includes a deletion request, a cell ID for the Home eNB 20, a mobile station ID and/or others.

At step S306, the MME 40A deletes the identification information for the mobile station to be deleted from the corresponding column for the Home eNB 20 in the access controlled mobile station database. At step S307, the MME 40A returns a user information update response indicative of deletion completion. The above-mentioned steps correspond to deletion sequence D for the access permitted mobile station.

At step S308a, the MME 40A further transmits a deletion request for discarding the cell search parameters for the Home eNB 20 to the mobile station 10 so that the mobile station 10 no longer uses the center frequency for the Home eNB 20. At step S308b, this deletion request is transmitted to the mobile station 10 in a dedicated control channel via the mobile station residing macro eNB 30B. At step S106, in response to reception of the deletion request, the mobile station 10 discards the stored cell search parameters for the Home eNB 20. The above-mentioned steps correspond to parameter deletion sequence E when the mobile station 10 resides in the adjacent macro eNB.

In the illustration in FIG. 2, the user information update request is supplied to the Home eNB 20 directly and sent from the Home eNB 20 to the MME 40A. In other embodiments, the user information update request for the Home eNB 20 may be transmitted to the MME 40A in combination by a mobile station of the owner of the Home eNB 20 or any other mobile station with a network server. Also in this case, the user information update request is relayed merely via different apparatuses, and thus the above-mentioned sequence holds.

Figure 3:
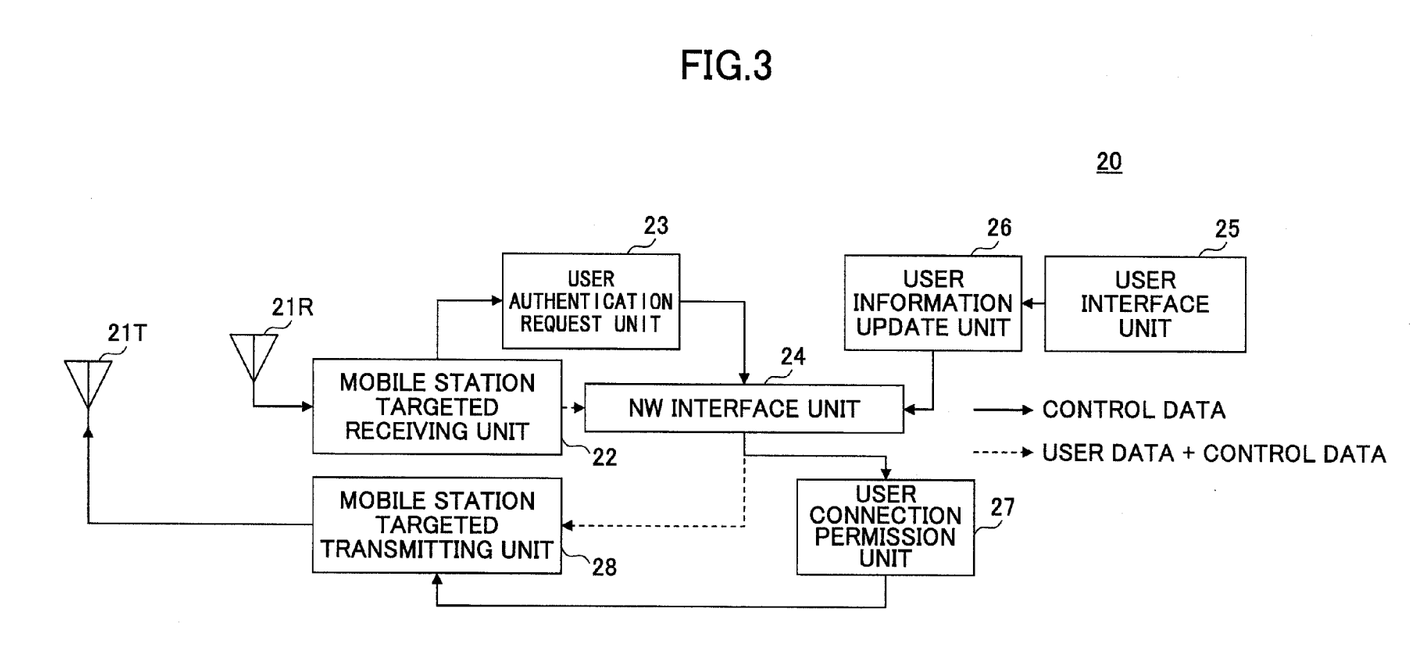
FIG. 3 is a schematic block diagram illustrating an exemplary arrangement of a Home eNB according to the first embodiment.

FIG. 3 is a schematic block diagram illustrating an exemplary arrangement of the Home eNB (base station) 20 according to the first embodiment. The Home eNB 20 includes a transmit antenna 21T, a receive antenna 21R, a mobile station targeted receiving unit 22, a user authentication request unit 23, a network interface unit 24, a user interface unit 25, a user information update unit 26, a user connection permission unit 27 and a mobile station targeted transmitting unit 28. Identification information of the mobile station 10 controlled for access (granting or releasing access permission) to the Home eNB 20 together with a control type (registration, deletion and others) is supplied to the user interface unit 25. The identification (ID) information of the mobile station 10 may include a telephone number, a specific number, an IMSI, a MSISDN and/or others. In order to prevent illicit input manipulation, the user interface unit 25 may request a password. The user interface unit 25 may be implemented in any interface for enabling reception of incoming mobile station information through a USIM card, a numeric keypad, sound, infrared communication and/or others.

The user information update unit 26 generates a user information update request including identification information of the mobile station 10, identification information of the Home eNB 20 and an access control type. The identification information of the Home eNB 20 may be a specific number such as a cell ID. The generated user information update request is transmitted to the MME 40A via the network interface unit 24.

Upon reception of an access request at the mobile station targeted receiving unit 22 from the mobile station 10 via the receive antenna 21R, the user authentication request unit 23 generates a user authentication request including the mobile station identification information and transmits it to the MME 40A via the network interface unit 24. If the mobile station is authenticated by the MME 40A, the user connection permission unit 27 generates an access permission message and transmits it from the transmit antenna 21T to the mobile station 10 via the mobile station targeted transmitting unit 28.

Figure 4:
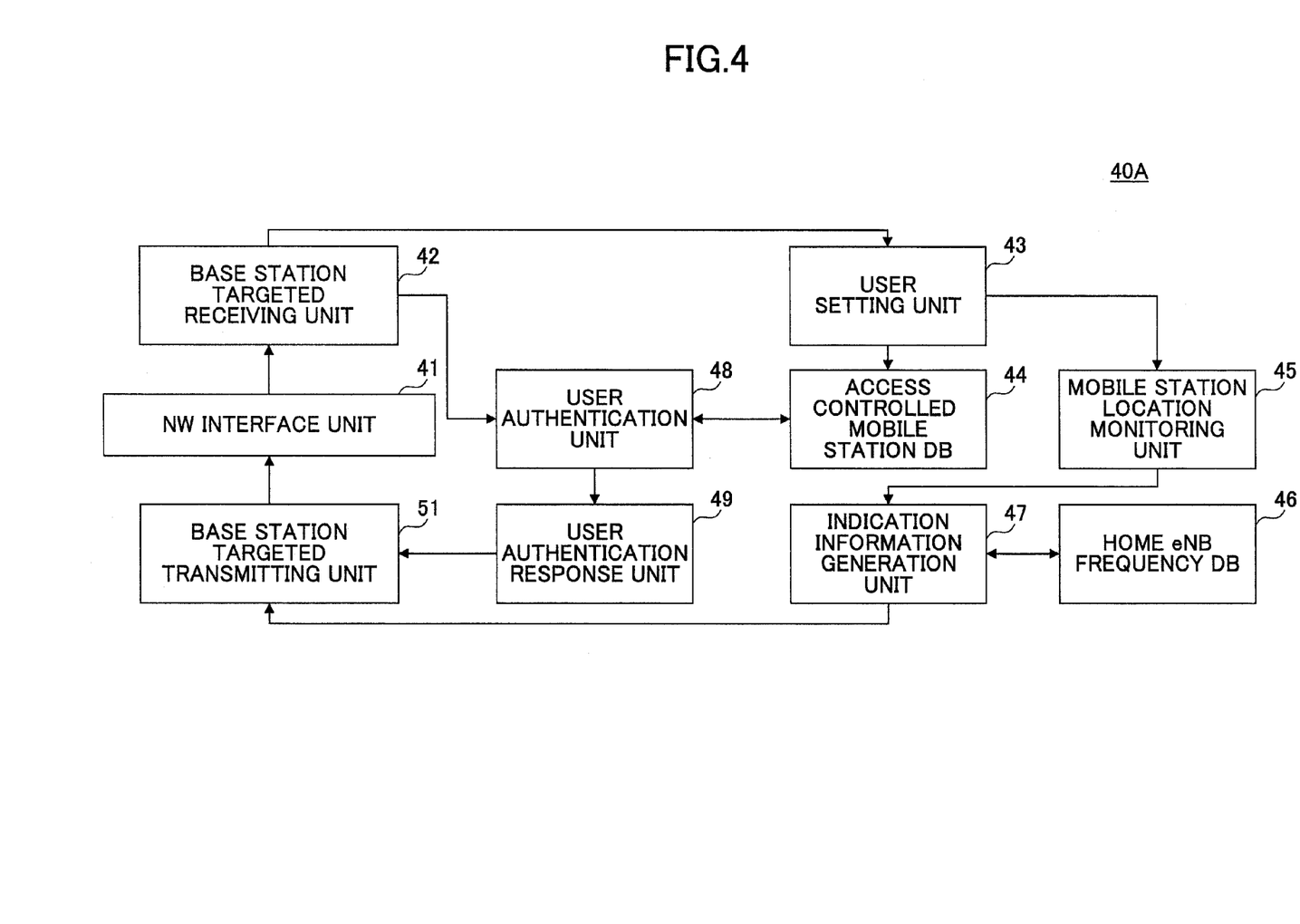
FIG. 4 is a schematic block diagram illustrating an exemplary arrangement of a MME according to the first embodiment.

FIG. 4 is a schematic block diagram illustrating an exemplary arrangement of the MME 40A according to the first embodiment. The MME 40A includes a network interface unit 41, a base station targeted receiving unit 42, a user setting unit 43, an access controlled mobile station database 44, a mobile station location monitoring unit 45, a Home eNB frequency database 46, an indication information generation unit 47, a user authentication unit 48, a user authentication response unit 49 and a base station targeted transmitting unit 51.

The base station targeted receiving unit 42 receives a user information update request (a registration request, a deletion request and so on) on a mobile station permitted to access any Home eNB via the network interface unit 41. The user information update request may be based on inputs at the Home eNB or may be supplied from a mobile station of the owner of the Home eNB or any mobile station via a network server.

The user setting unit 43 registers identification information of a newly access permitted mobile station with an entry for the relevant Home eNB in the access controlled mobile station database or deletes the identification information of a mobile station, whose access permission has been cancelled, from the entry depending on the access control type of the user information update request.

The mobile station location monitoring unit 45 monitors the location of a mobile station, whose access permission is registered with the access controlled mobile station database 44, at the level of tracking areas, for example. Upon detecting that the mobile station exists now near the corresponding Home eNB (within an adjacent macro cell), the mobile station location monitoring unit 45 supplies the detected mobile station registration to the indication information generation unit 47. The indication information generation unit 47 generates cell search parameters including at least the center frequency for a Home eNB with reference to the Home eNB frequency database 46. The generated information is transmitted to the mobile station via the base station targeted transmitting unit 51, the network interface 41 and the mobile station's resident macro eNB (see FIG. 1). For this reason, a connection information transmitting unit would consist of the indication information generation unit 47, the base station targeted transmitting unit 51 and the network interface unit 41. Similar operations may be performed on a parameter deletion request for a mobile station whose access permission is cancelled.

Upon reception of a user authentication request from any Home eNB, the user authentication unit 48 authenticates the user with reference to the access controlled mobile station database 44. The user authentication response unit 49 generates a response as to whether to permit the user to access the Home eNB based on the authentication. This access authentication response is transmitted to the Home eNB via the base station targeted transmitting unit 51 and the network interface 41.

In this manner, according to the first embodiment, the information on access permitted mobile stations is managed in the network side (MME 41A), and in response to requests from Home eNBs, the upper node authenticates the users.

[Second Embodiment]

Figure 5:
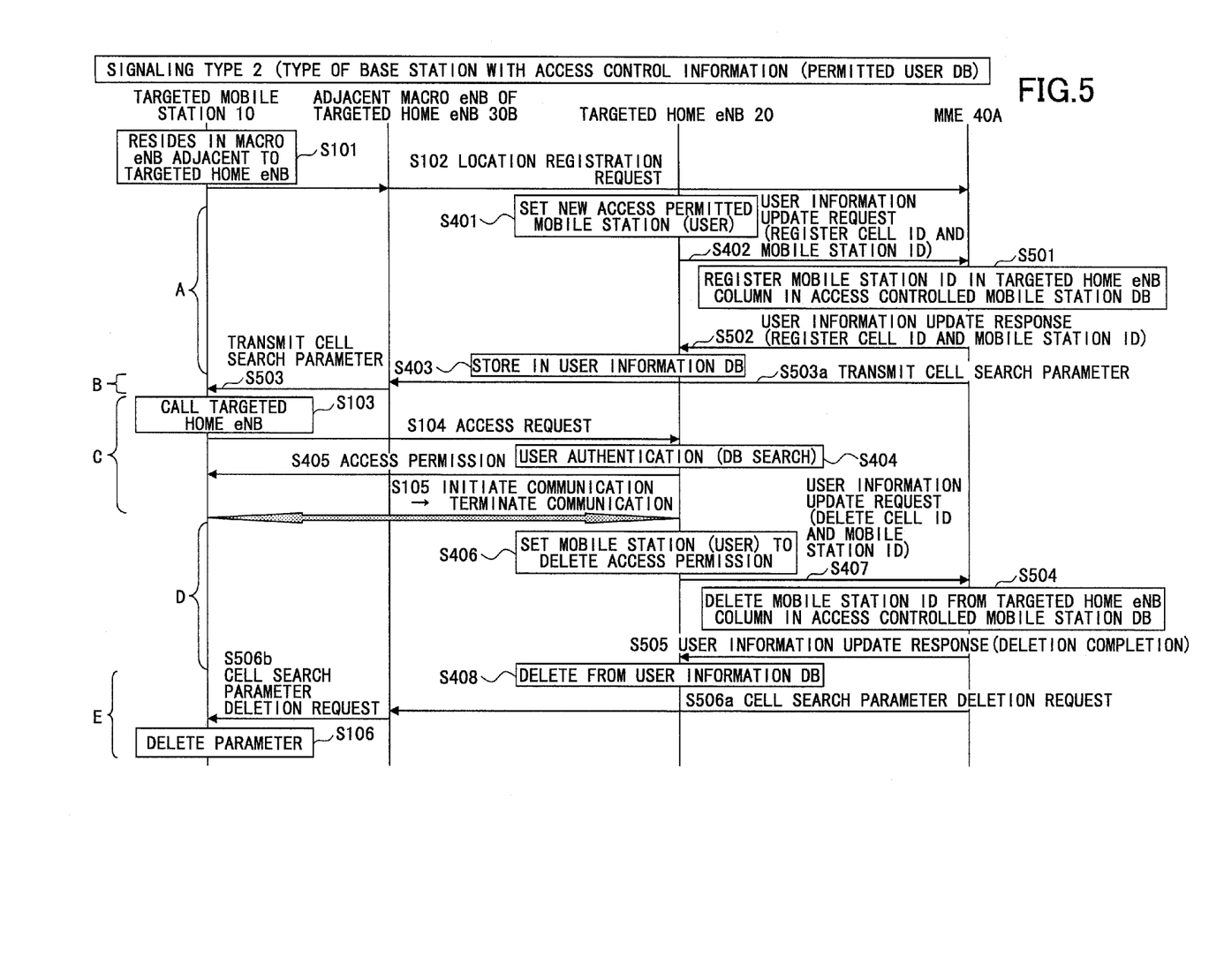
FIG. 5 is a sequence diagram illustrating registration and/or deletion of access permitted mobile station information according to a second embodiment.

The second embodiment is described with reference to FIGS. 5-7 in detail below. In the second embodiment, the Home eNB 20 possesses access control information itself. FIG. 5 is a sequence diagram illustrating an exemplary signal flow among the mobile station 10, the adjacent macro cell 35B, the Home eNB 20 and the MME 40A.

The mobile station 10 resides in the adjacent macro eNB 30B for the Home eNB 20 at step S101 and transmits a location information update request to the MME 40A via the macro eNB 30B at step S102. On the other hand, the Home eNB 20 sets access permission information (user information) to grant new access permission to the mobile station 10 at step S401 and transmits a user information update request to the MME 40A at step S402. At step S501, the MME 40A newly registers user information on the mobile station 10 in a column for the Home eNB 20 in the access controlled mobile station database. After the registration, at step S502, the MME 40A transmits a user information update response indicative of completion of the registration of the mobile station 10 to the Home eNB 20. The above-mentioned steps are similar to the first embodiment. In the second embodiment, in response to reception of the user information update response, at step S403, the Home eNB 20 stores the information on the newly access permitted mobile station 10 in its user information database. The above-mentioned steps correspond to registration sequence A for the access permitted mobile station.

Since the MME 40A recognizes that the newly registered mobile station 10 resides in the macro eNB 30 within the tracking area 35 associated with the Home eNB 20, at step S503*b*, the MME 40A transmits cell search parameters including the center frequency for the Home eNB 20 to the macro eNB 30B. The above-mentioned steps correspond to parameter transmission sequence B when the access permitted mobile station resides in the cell of the adjacent macro eNB and are similar to the first embodiment.

The mobile station 10 transmits a call to the Home eNB 20 at the center frequency for the Home eNB 20 indicated from the MME 40A at step S103 and issues an access request at step S104. At step S404, the Home eNB 20 searches the user information database and authenticates the mobile station 10. If it is determined that the mobile station 10 is permitted to access the Home eNB 20, at step S405, the Home eNB 20 returns an access permission to the mobile station 10. The above-mentioned steps correspond to authentication sequence C for the access permitted mobile station according to the second embodiment.

At step S105, the mobile station 10 communicates to the Home eNB 20. Then, if the access permission of the mobile station 10 becomes unnecessary, at step S406, the Home eNB 20 sets access permission deletion information for the mobile station 10 at step S406 and transmits a user information update request to the MME 40A at step S407. This user information update request includes a deletion request, a cell ID for the Home eNB 20, a mobile station ID and/or others.

The MME 40A deletes the identification information for the mobile station to be deleted from the column corresponding to the Home eNB 20 in the access controlled mobile station database at step S504 and returns a user information update response indicative of completion of the deletion at step S505. Upon reception of the user information update response, at step S408, the Home eNB 20 deletes the access permission information for the mobile station 10 from the user information database. The above-mentioned steps correspond to deletion sequence D for the access permitted mobile station according to the second embodiment.

At steps S506a and S506b, in order to avoid the mobile station 10 subsequently using the center frequency for the Home eNB 20, the MME 40A further transmits a cell search parameter deletion request for deleting the cell search parameters for the Home eNB 20 to the mobile station 10 via the macro eNB 30B in a dedicated control channel. Upon receiving the deletion request, at step S106, the mobile station 10 discards the stored cell search parameters for the Home eNB 20. The above-mentioned steps correspond to parameter deletion sequence E similar to the first embodiment.

Figure 6:
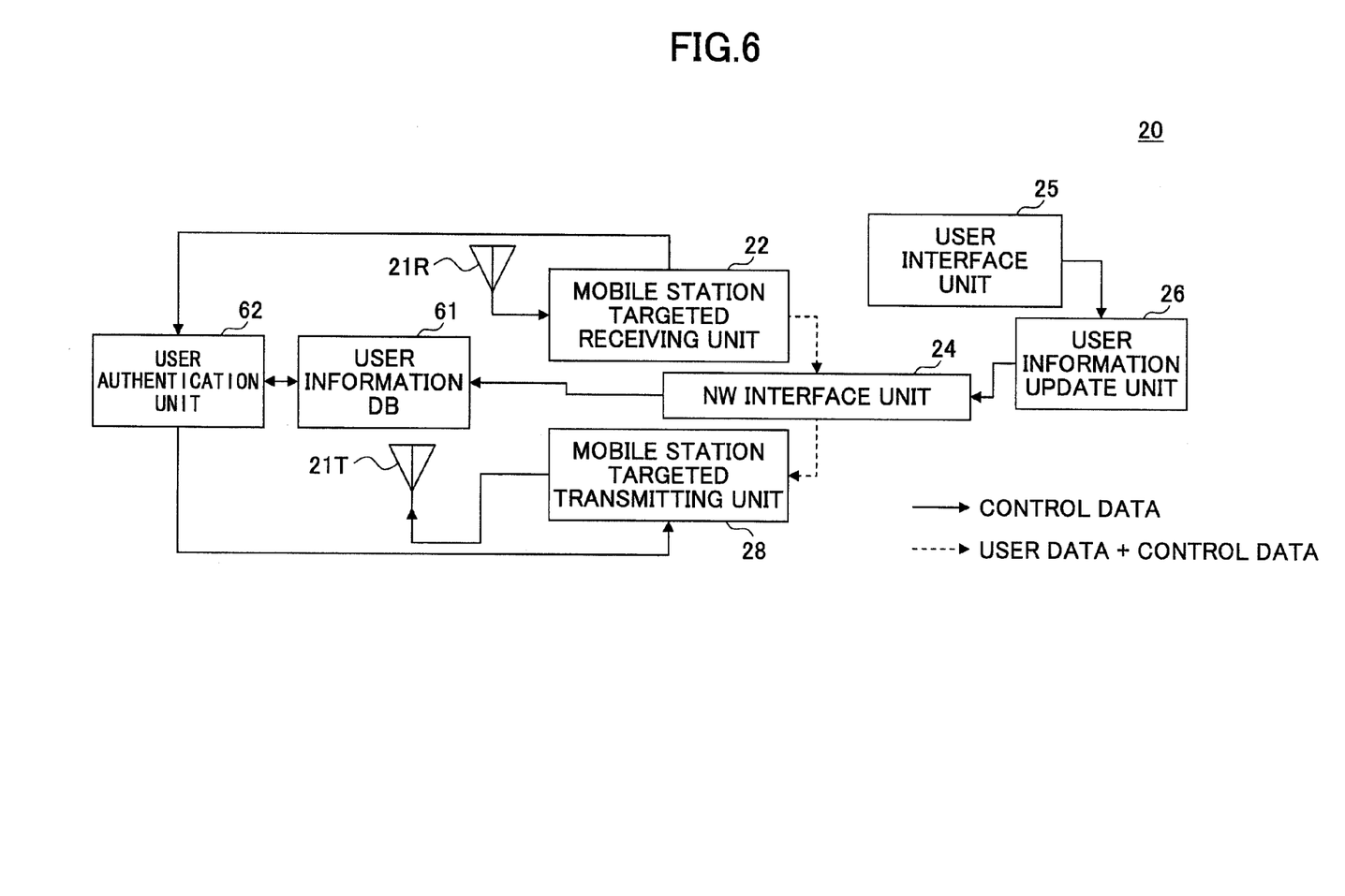
FIG. 6 is a schematic block diagram illustrating an exemplary arrangement of a Home eNB according to the second embodiment.

FIG. 6 is a schematic block diagram illustrating an exemplary arrangement of the Home eNB (base station) 20 according to the second embodiment. In this illustration, the same symbols are used for the same components as those in the first embodiment, and descriptions thereof are simplified. The Home eNB 20 includes a transmit antenna 21T, a receive antenna 21R, a mobile station targeted receiving unit 22, a network interface unit 24, a user interface unit 25, a user information update unit 26, a mobile station targeted transmitting unit 28, a user information database 61 and a user authentication unit 62.

Identification information of the mobile station 10, whose access permission to the Home eNB 20 is controlled, together with a control type (registration, deletion and so on) is supplied via the user interface unit 25. The user information update unit 26 generates a user information update request for the mobile station 10 and sends it to the MME 40A via the network interface unit 24.

When the Home eNB 20 receives an update result (response) from the MME 40A via the network interface unit 24, the update result is stored in the user information database 61. In order to store the result for the user information update request in the user information database 61, the user information database 61 replicates contents in the access controlled mobile station database in the MME 40A in a mirroring manner. As a result, it is possible to achieve faster user authentication and reduce signaling load between the Home eNB 20 and the MME 40A.

When the mobile station targeted receiving unit 22 receives an access request from the mobile station 10 via the receive antenna 21R, the user authentication unit 62 determines whether to authenticate the mobile station 10 with reference to the user information database 61. If it is determined that the mobile station 10 is authorized to access the Home eNB 20, the user authentication unit 62 permits the mobile station 10 to access the Home eNB 20. In this manner, the access authentication is locally determined at the Home eNB 20 according to the second embodiment.

Figure 7:
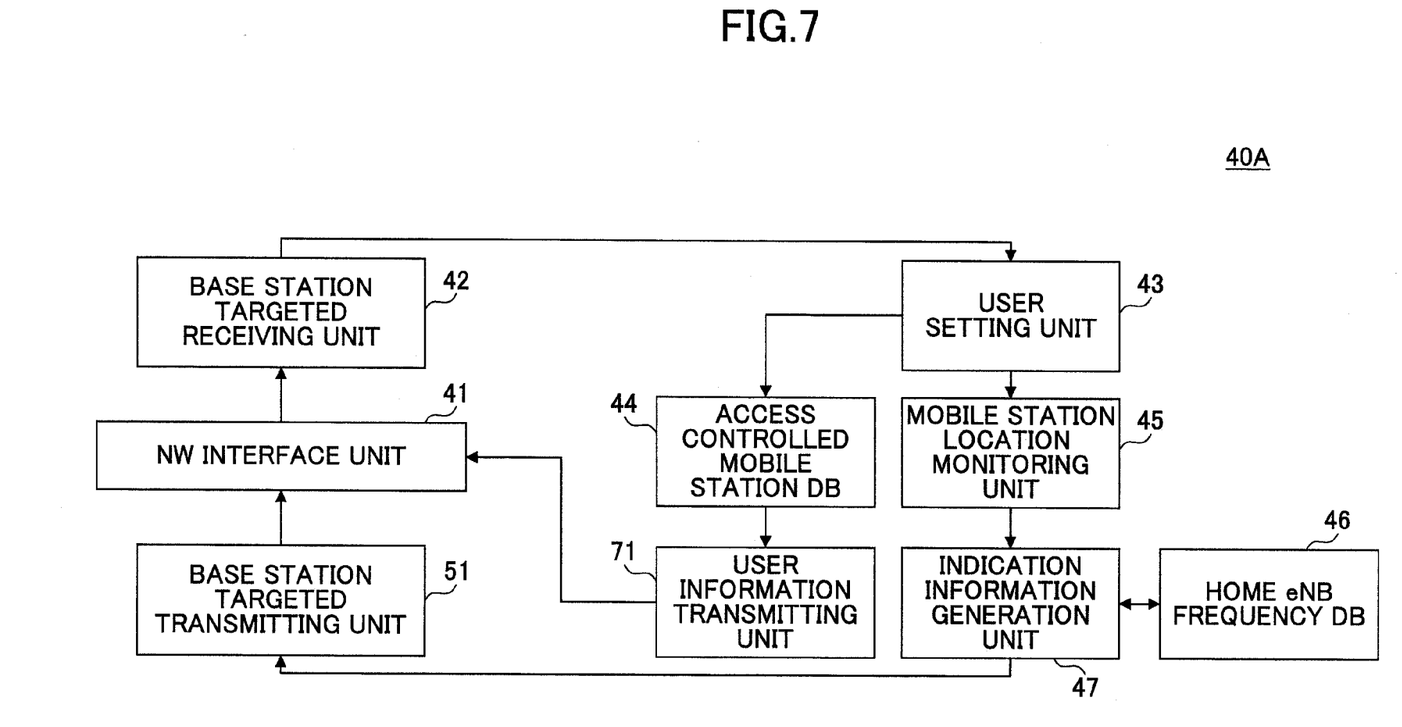
FIG. 7 is a schematic block diagram illustrating an exemplary arrangement of a MME according to the second embodiment.

FIG. 7 is a schematic block diagram illustrating an exemplary arrangement of the MME 40A according to the second embodiment. The same symbols are used for the same components as those of the first embodiment, and descriptions thereof are simplified. The MME 40A includes a network interface unit 41, a base station targeted receiving unit 42, a user setting unit 43, an access controlled mobile station database 44, a mobile station location monitoring unit 45, a Home eNB frequency database 46, an indication information generation unit 47, a base station targeted transmitting unit 51 and a user information transmitting unit 71.

The base station targeted receiving unit 42 receives a user information update request (a registration request, a deletion request and so on) for a mobile station permitted to access any Home eNB via the network interface unit 41. The user setting unit 43 registers identification information of a newly access permitted mobile station with an entry corresponding to the relevant Home eNB in the access controlled mobile station database 44 or deletes the identification information of a mobile station, whose access permission is cancelled, from the entry depending on the access control type of the user information update request.

The mobile station location monitoring unit 45 monitors the location of a mobile station, whose access permission is registered in the access controlled mobile station database 44, at the level of tracking areas, for example. Upon detecting that the mobile station exists now near the corresponding Home eNB (within an adjacent macro cell), the mobile station location monitoring unit 45 supplies the detection information to the indication information generation unit 47. The indication information generation unit 47 generates cell search parameters including at least the center frequency for the Home eNB with reference to the Home eNB frequency database 46. The generated information is transmitted to the mobile station via the network interface unit 41 and the mobile station resident macro eNB (see FIG. 1). Similar operations are performed on parameter deletion requests for mobile stations whose access permission is cancelled.

The user information transmitting unit 71 transmits an update result of the access controlled mobile station database 44 to the Home eNB 20 via the base station targeted transmitting unit 51 and the network interface unit 41.

In this manner, information management and user authentication for the access permitted mobile stations are locally performed at the Home eNBs.

This international patent application is based on Japanese Priority Application No. 2007-120261 filed on Apr. 27, 2007, the entire contents of which are hereby incorporated by reference.

The invention claimed is:

1. An access control method for a certain user targeted base station, comprising:
supplying information regarding a mobile station permitted to access the certain user targeted base station to the certain user targeted base station;
transmitting the information regarding the access permitted mobile station to a mobile communication management apparatus on a network;
storing the information regarding the access permitted mobile station in the mobile communication management apparatus in association with the certain user targeted base station; and
when the mobile communication management apparatus detects that the access permitted mobile station has entered a location registration area covering the certain user targeted base station or exists in the location registration area, transmitting connection information for the certain user targeted base station from the mobile communication management apparatus to the access permitted mobile station,
wherein the connection information is transmitted in a dedicated control channel, the connection information including a center frequency of the certain user targeted base station to enable the access permitted mobile station to detect the certain user targeted base station.

2. The access control method as claimed in claim 1, further comprising:
supplying access cancel information for the access permitted mobile station to the certain user targeted base station;
transmitting the access cancel information to the mobile communication management apparatus on the network; and
deleting the information regarding the access permitted mobile station from the mobile communication management apparatus.

3. The access control method as claimed in claim 2, further comprising:
upon reception of a connection request to connect to the certain user targeted base station from a mobile station, authenticating the mobile station at the mobile communication management apparatus based on information stored in the mobile communication management apparatus.

4. The access control method as claimed in claim 2, further comprising:
upon reception of a connection request to connect to the certain user targeted base station from a mobile station, authenticating the mobile station at the certain user targeted base station based on the information regarding the access permitted mobile station.

5. The access control method as claimed in claim 2, further comprising:
upon reception of a record update message from the mobile communication management apparatus, storing an updated record in the certain user targeted base station.

6. The access control method as claimed in claim 1, further comprising:
upon reception of a connection request to connect to the certain user targeted base station from a mobile station, authenticating the mobile station at the mobile communication management apparatus based on information stored in the mobile communication management apparatus.

7. The access control method as claimed in claim 1, further comprising:
upon reception of a connection request to connect to the certain user targeted base station from a mobile station, authenticating the mobile station at the certain user targeted base station based on the information regarding the access permitted mobile station.

8. The access control method as claimed in claim 1, further comprising:
upon reception of a record update message from the mobile communication management apparatus, storing an updated record in the certain user targeted base station.

9. The access control method as claimed in claim 7, further comprising:
upon reception of a record update message from the mobile communication management apparatus, storing an updated record in the certain user targeted base station,
wherein the authenticating step at the certain user targeted base station is based on the updated record stored in the certain user targeted base station.

10. A mobile communication management apparatus, comprising:
a receiving unit configured to receive access control information regarding a mobile station permitted to access a certain user targeted base station from the certain user targeted base station;
a storage unit configured to store the access control information;
a mobile station location monitoring unit configured to monitor location of a mobile station at a level of location registration areas;
a connection information transmitting unit configured to, when the mobile station location monitoring unit detects that the access permitted mobile station has entered a location registration area or exists in the location registration area, transmit connection information for the certain user targeted base station to the access permitted mobile station,
wherein the connection information is transmitted in a dedicated control channel, the connection information including a center frequency of the certain user targeted base station to enable the access permitted mobile station to detect the certain user targeted base station.

11. The mobile communication management apparatus as claimed in claim 10, wherein if the access control information received at the receiving unit is an access permission registration request, the storage unit stores the access permitted mobile station registration in association with the certain user targeted base station.

12. The mobile communication management apparatus as claimed in claim 10, wherein if the access control information received at the receiving unit is an access cancel request, the storage unit deletes the access permitted mobile station registration.

13. The mobile communication management apparatus as claimed in claim 10, further comprising:
a user authentication unit configured to, when the receiving unit receives an authentication request for a mobile station from the certain user targeted base station, authenticate the mobile station with reference to the storage unit; and
a response unit configured to return a result of the authentication to the certain user targeted base station.

14. The mobile communication management apparatus as claimed in claim 11, further comprising:
a user information transmitting unit configured to, when the access control information is updated in the storage unit, transmit an update completion message to the certain user targeted base station.

15. The mobile communication management apparatus as claimed in claim 12, further comprising:
 a user information transmitting unit configured to, when the access control information is updated in the storage unit, transmit an update completion message to the certain user targeted base station.

\* \* \* \* \*